Nov. 3, 1936.    P. M. MARSHALL    2,059,261
FARM TRACTOR
Filed March 11, 1933    5 Sheets-Sheet 1

INVENTOR.
Paul M. Marshall
BY Chappell and Earl
ATTORNEYS.

Nov. 3, 1936.  P. M. MARSHALL  2,059,261
FARM TRACTOR
Filed March 11, 1933  5 Sheets-Sheet 2
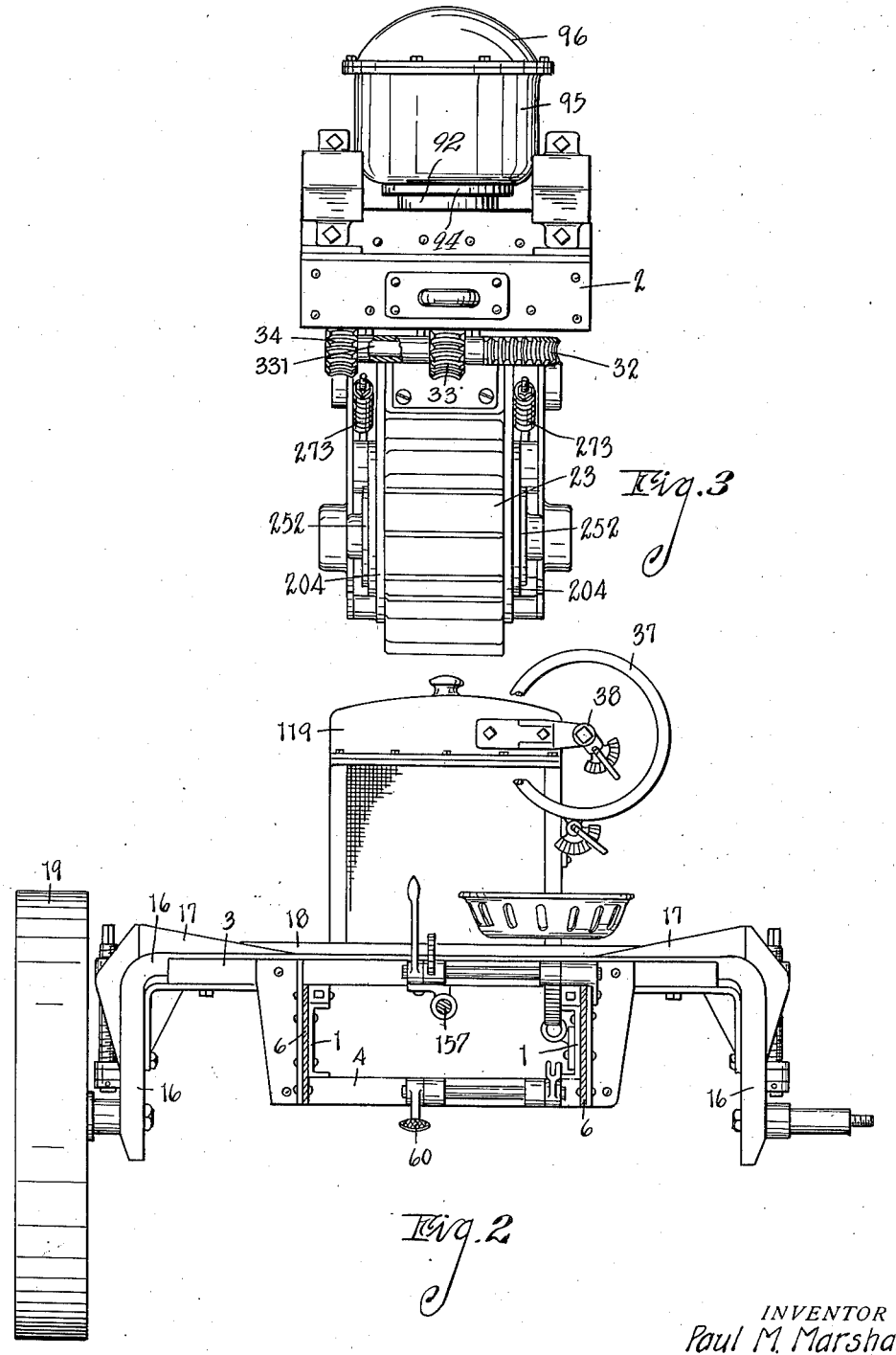
INVENTOR
Paul M. Marshall
BY
Chappell & Earl
ATTORNEYS INVENTOR
Paul M. Marshall
BY
Chaffell & Earl
ATTORNEYS Nov. 3, 1936.  P. M. MARSHALL  2,059,261
FARM TRACTOR
Filed March 11, 1933  5 Sheets-Sheet 4
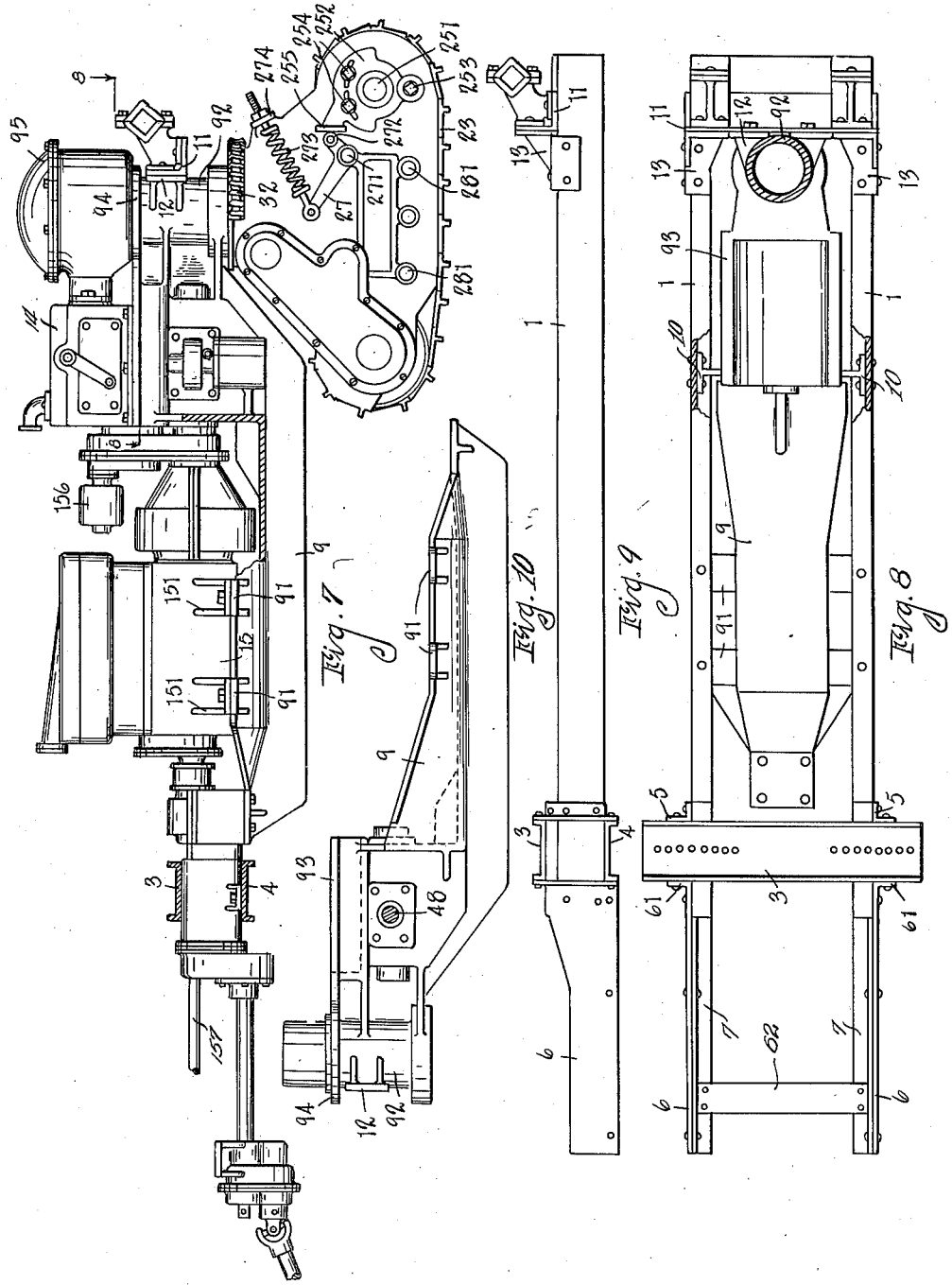
INVENTOR
Paul M. Marshall
BY
Chappell & Earl
ATTORNEYS

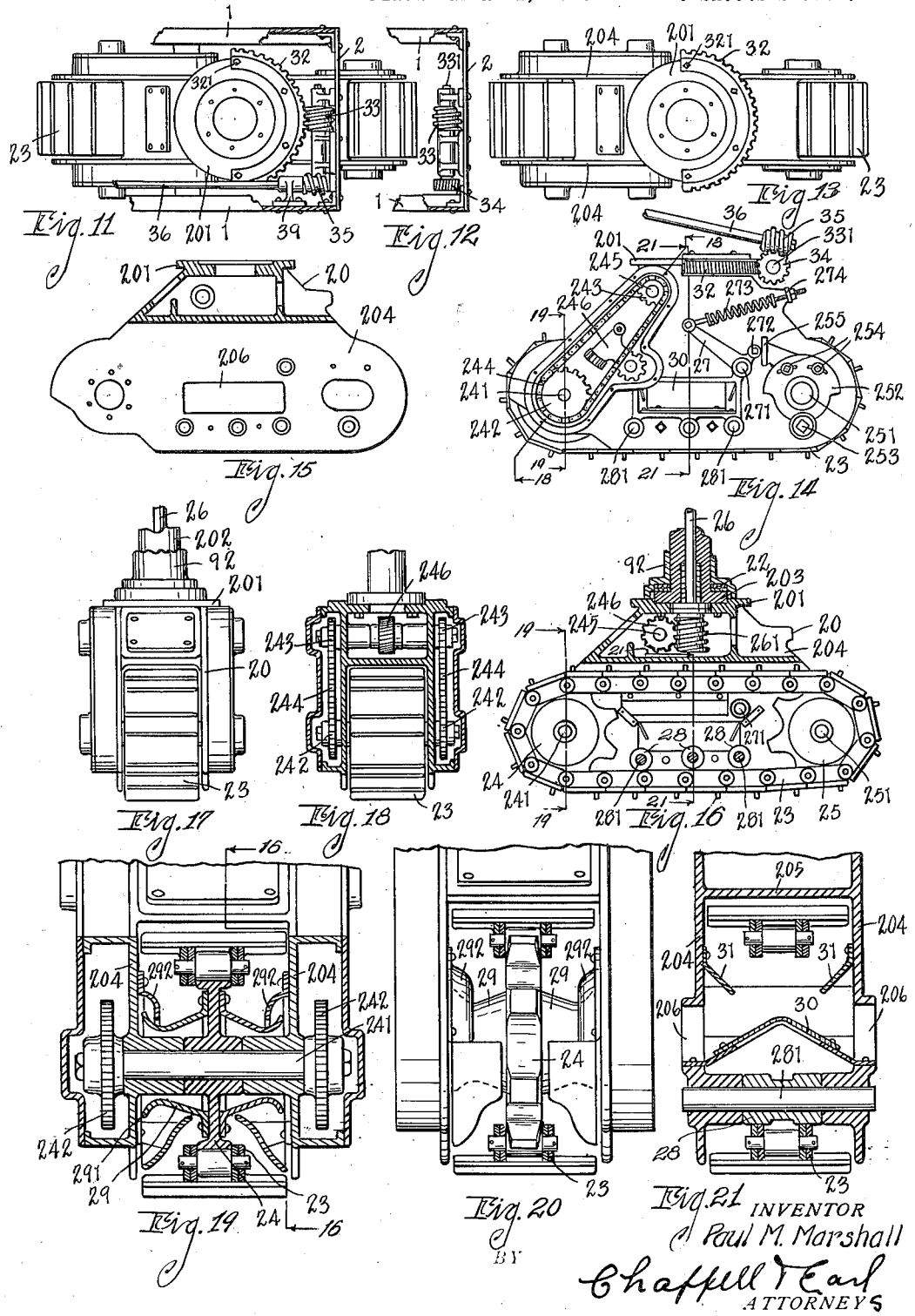

Patented Nov. 3, 1936

2,059,261

UNITED STATES PATENT OFFICE 2,059,261

FARM TRACTOR

Paul M. Marshall, Constantine, Mich.

Application March 11, 1933, Serial No. 660,363

5 Claims. (Cl. 180—9.1)

The objects of this invention are:

First, to provide an improved construction of farm tractor.

Second, to provide a front truck of the crawler type with improved steering means.

Third, to provide improved truck or trailer in combination with front steering means.

Fourth, to provide a tractor with an improved combined steering and driving truck or crawler at its forward end.

Fifth, to provide a tractor which is able to pass between extremely narrow rows with its front truck or crawler.

Other objects and advantages pertaining to details and economies of construction and operation will appear from the description to follow. A preferred embodiment of my invention is illustrated in the accompanying drawings, in which:

Fig. 2 is a rear end elevational view partly in section, showing the driver's seat and the relation of the steering wheel and controls.

Fig. 3 is a front elevation of the front part of the machine illustrating the worm gear steering means for the crawler.

Fig. 7 is a side elevation, partly broken out in section, showing the right hand side of the tractor, showing the base casting and crawler, front gear housing, transmission, oil circulating pump, motor support and power take-off attached, the rear wheels being omitted and the axle support in section.

Fig. 8 is a plan view partially in section on line 8—8 of Fig. 7 of the main channel frame with the power frame attached.

Fig. 9 is a side elevation of the main channel frame for supporting the working parts.

Fig. 10 is a left hand side elevation of the main housing for the front mechanism.

Fig. 11 is a detail top plan view of the front crawler and steering device with parts broken away.

Fig. 12 is a detail elevational view of the front of the crawler as seen in Fig. 11 with the steering worm gear connection shown.

Fig. 13 is a top plan view of the front crawler with steering worm removed.

Fig. 14 is a side elevation of the front crawler and its steering device, with roller chain housing cover removed.

Fig. 15 is a longitudinal sectional elevation of the crawler housing and casing only.

Fig. 16 is a central longitudinal sectional elevation of the crawler frame showing the crawler sprockets, crawler chain and worm drive taken on line 16—16 of Fig. 19.

Fig. 17 is a detail rear end elevational view of the crawler assembly.

Fig. 18 is a detail cross section of the crawler assembly on the indicated line 18—18 of Fig. 14, showing the sprockets and gearing.

Fig. 19 is an enlarged detail cross section on the section line 19—19 of Fig. 14, showing the cross section of the rear crawler chain, crawler sprocket, dirt guards, and roller chain sprocket.

Fig. 20 is a similar enlarged detail end elevation looking from the left of Fig. 16 of the crawler sprocket, and crawler chain and guards. The chain only being in section.

Fig. 21 is a cross section on an enlarged scale on line 21—21 of Figs. 14 and 16 showing one of the three rollers that support the lower side of the crawler chain and the dirt guards.

The parts will be identified by their numerals of reference which are the same in all the views.

Figure 1:
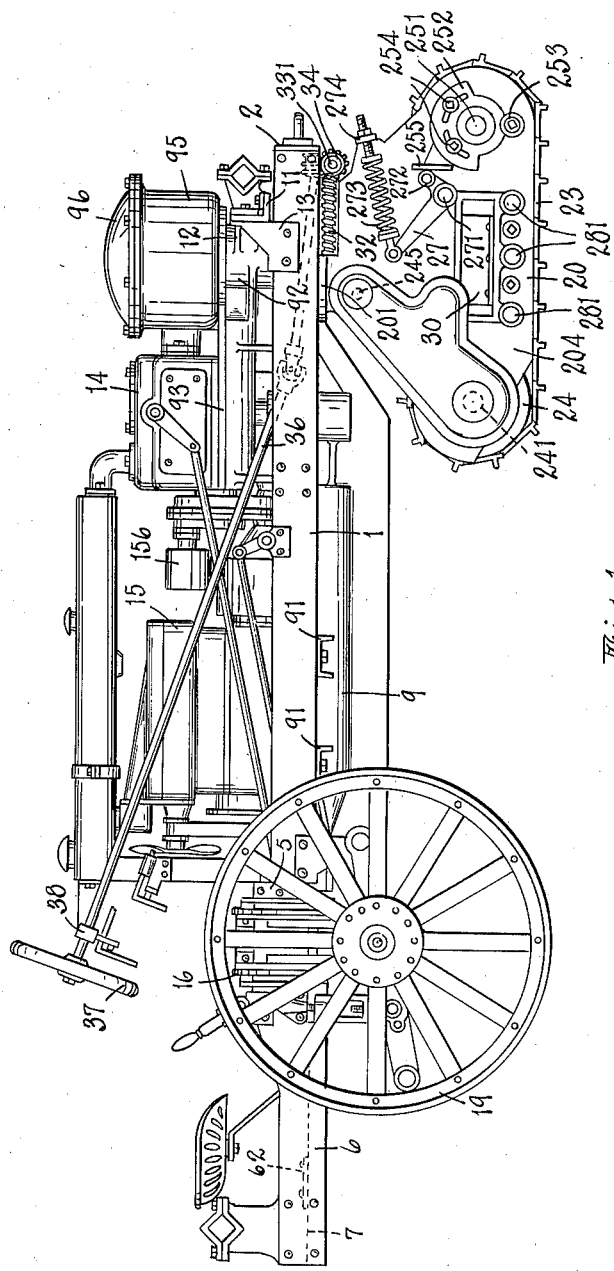
Fig. 1 is a side elevation showing my improved tractor equipped with front and rear tillage tools, the front end being cut off.
Figure 4:
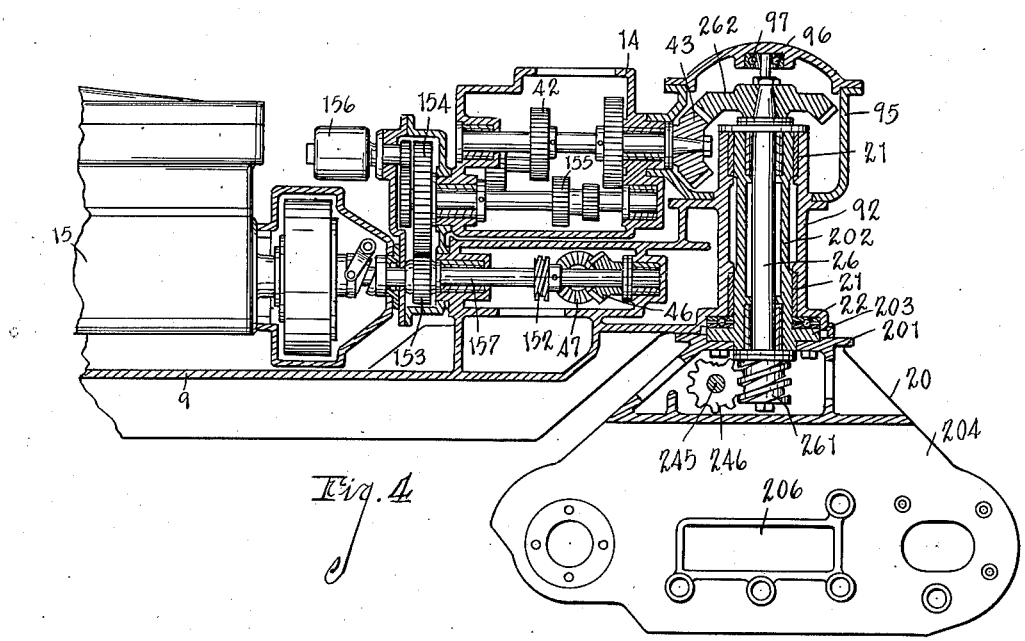
Fig. 4 is a vertical longitudinal section showing the transmission and worm gear drive.

1, 1 are the channel side bars of the main frame. 2 is the front end bar of the main frame connecting these side bars together. (See Figs. 1, 11 and 12.) 3, 4 are the rear channel-like cross members of the frame which also form the support for the rear axles. (See Fig. 2.) These cross members are connected to the channel frame bars 1, 1 by vertical angle bars 5, 5 (see Fig. 8), suitably bolted or riveted thereto. 6, 6 are rear extension bars of the frame secured to the cross members 3, 4 by angle portions 61 suitably riveted or bolted thereto. A rear cross bar 62 ties the rear ends of the extension 6, 6 together. 7, 7 are stiffening angle bars (see Fig. 8) for the extensions 6, 6. 8, 8 are spacer or filler members on the upper edges of the channel bars 1 beneath the top cross channel member 3.

9 is the base casting (see Figs. 7-10) which carries the main operating and driving mechanism of the entire machine. T-shaped brackets 10, 10 extend inwardly from the channel bars 1, 1 (see Fig. 8), and are bolted or otherwise secured to the main body of the base casting 9 to support it in place. An angle cross bar 11 is secured to pad 12 on the front end of the casting 9 (see Figs. 1-8), and is disposed on the top of the channel side bars 1, 1 of the frame, being secured thereto by brackets 13, 13 at each side (see Fig. 9). Cross arms 91, 91, two on each side, project out from the base casting 9 and are bolted to the under side of the channel side rails 1, 1 and tie the same together and greatly strengthen the frame. (See Figs. 1-8.)

The base casting 9 carries at its forward end a vertical cylindrical housing shell 92, the lower end of which rests upon the front crawler tractor frame and is pivotally supported thereby. Towards the front the base casting 9 is provided with a deck 93 on which is disposed the transmission housing 14 (see Figs. 1-7). The engine block 15 is provided with a pair of lateral lugs 151 on each side which are bolted to the lateral arms 91 of the base casting just inside the side frames 1. The engine block can be secured in any desired manner. The fly wheel housing and the reducing gear are disposed towards the front of the engine and are suitably housed and carried therebetween.

Two L-shaped rear axle members 16, 16 are provided (see Fig. 2), one at each side, arms 17, 17 from which are disposed in the channel of the cross bar 3 and are retained by the clamping cross plate 18 suitably bolted thereto, a plurality of holes longitudinally thereof providing adjusting means for the adjusting of the length of the said axle members (see Fig. 2).

The axles carry the wheels 19, 19 which serve as the rear support for the entire machine. The front of the machine is supported upon the power driven crawler traction truck by which the entire machine is propelled.

20 is the crawler frame which carries the endless crawler chain structure of any desired structure for propelling the machine. It is provided with a top turntable platform 201 to which is bolted the upright bearing sleeve 202 by its bottom flange 203. This sleeve 202 (see Fig. 4) engages bronze or other suitable bearings 21, 21 at its upper and lower ends within the cylindrical housing 92.

Thrust bearing 22 is provided on the said flange 203 for supporting the weight of the front end of the machine. This amounts to what might be called the king pin pivot for the front of the machine. It is a turntable.

The crawler frame 20 is made up of side plates 204, 204 between which is disposed the crawler chain 23, which is made up of any suitable link structure for the purpose. This is carried on a pair of supporting sprocket wheels 24 the driven wheel and 25 the idler wheel. These are supported on cross shafts 241 and 251 respectively. On the opposite ends of the driven shaft 241 are sprocket wheels 242 (see Fig. 14). These are driven from sprocket pinions 243 which are provided with sprocket chains 244 at each side. The sprocket pinions 243 are carried by cross shaft 245 which is journalled in the sides 204 of the frame.

At the center of cross shaft 245 is a worm gear 246. Vertically and centrally of the sleeve 202 is a driven shaft 26 which has at its lower end a worm 261 meshing with and driving the worm gear 246. The sprocket chains are each provided with a tightener 247 of any desired construction.

Shaft 26 is provided at its upper end with beveled gear 262 which is driven from the engine connection hereafter to be described. Shaft 26 is supported in the upright sleeve 202 above described, by roller bearings being journalled therein.

The shaft 251 for the idler front sprocket 25 is carried by pivoted side members 252 which are fulcrumed at 253 and are suitably guided by guide pins 254, in suitable slots. A pair of bent levers 27 are fulcrumed at 271 on the side plates of the crawler frame 20, the short arms bearing rollers 272 which react against lugs 255 on the pivoted members 252. Heavy duty springs 273 are connected to the long arms of the lever and to lugs 274 on the sides of the frame 20. Thus when the chains meet an obstruction the shaft 251 can yield until the obstruction is overcome and the chain released.

The crawler chain 23 is provided with a guide for the lower run consisting of a plurality, here shown as three, guide rollers 28 carried on suitable cross shafts 281 carried by the sides of the frame 20. A cross plate 205 braces the entire crawler frame and houses in and protects the crawler structure. It also is the bottom of the housing for the driving mechanism (see Figs. 16-21).

Supported on the web of the crawler sprocket wheel 24 at each side is a bell-shaped guard 29 with a flaring flanged mouth 291 in proximity to each side wall 204 of the frame 20. A semi-circular flange guard 292 corresponding to the flange 291 is carried by each side wall and embraces the upper edge of the said flange 291 to deflect any debris from the joint and prevent its entering the bearings. Longitudinally internally of the casing 20 is the A-shaped guard cover plate 30 which is capable of being removed for inspection or repair. Longitudinal flange guards 31 deflect any debris falling from the upper run of the chain toward the center where it will eventually be discharged out at the side openings 206 in the side walls 204 of casing 20.

It will be seen from what has been stated that the crawler tractor frame provides a turntable support for the front end of the machine and the machine is steered by controlling the direction of the tractor crawler truck. This is accomplished by securing to the casing 20 a segment worm gear 32 which is secured to the upper flange 201 by bolts or screws 321. A driving worm 33 engages this segment and is carried on cross shaft 331 supported in bearing brackets 332 on the end cross member 2 of the main frame. (See Figs. 11 and 12.) A worm gear 34 is on the said shaft 331 and is driven by a worm 35 on the front end of steering column 36 which is controlled by the steering wheel 37. The steering column is supported in any suitable journal bearings for the purpose. It is shown as being supported by bracket 38 at its rear end (see Fig. 1) and 39 at its forward end (see Fig. 11).

Figures 5, 6:
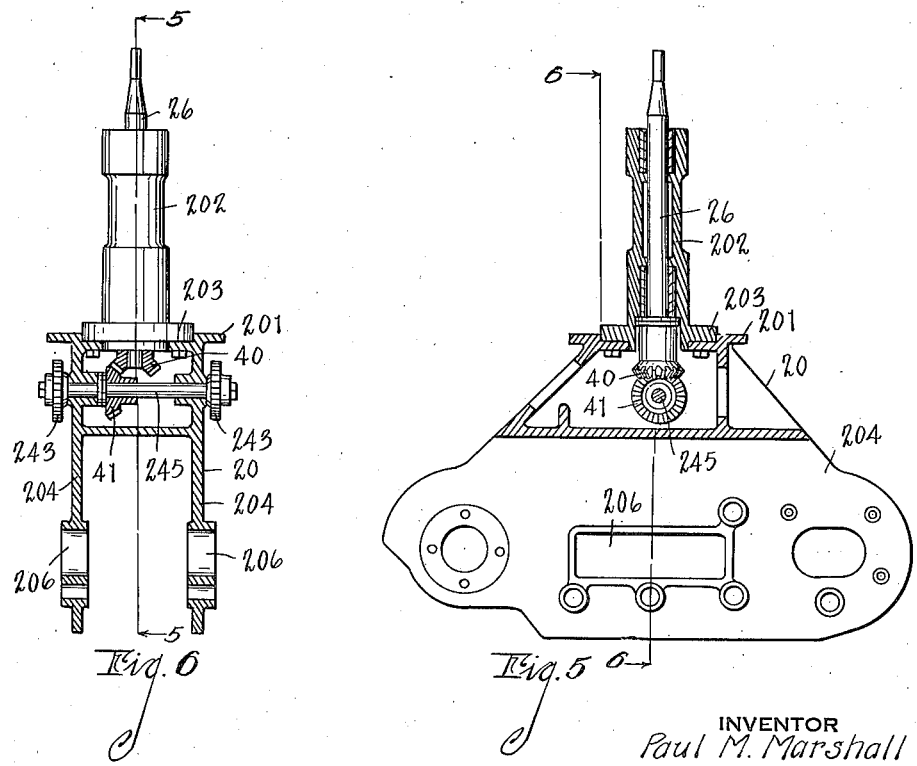
Fig. 5 is a vertical longitudinal section, taken on line 5—5 of Fig. 6, of a modified crawler structure showing a bevel gear drive for the crawler instead of a worm drive as shown in Fig. 4.
Fig. 6 is a cross section of the said modified structure taken on irregular line 6—6 of Fig. 5.

I have shown a worm drive on the vertical shaft 26 for the tractor. This is preferred. It might be beveled gears 40, 41 as seen in Figs. 5 and 6, the parts otherwise being essentially the same. I show this as a modification.

A usual change gear transmission 42 is provided in the transmission housing 14. A driving pinion 43 driven by this change gear is supported in meshing relation to the driven gear 262 on shaft 26. A housing 95 (see Fig. 4) is disposed over these parts resting on flange 94 being provided with a cover 96 having a central ball journal bearing 97 for the upper end of the shaft 26.

The internal combustion engine block 15 with the usual internal combustion engine and front propeller shaft 157 drives the mechanism.

A worm 152 on shaft 157 drives the worm gear 44 for the oil circulating pump 45. There is also on the propeller shaft 157, the beveled pinion 46 driving pinion 47 which is on shaft 48 on which is the power take off pulley 49. The power take off pulley may of course be detached or otherwise disconnected when not in use. This power take off is not a necessity. Propeller shaft 157 also carries driving pinion 153 which is in mesh with gear 154 that constitutes the reducing gear to the change gear transmission. This is provided with a chain of gears 155 and drives an electric generator 156 of any desired capacity which may provide current and charge the usual storage battery (not shown).

Having thus described my invention what I claim as new and desire to secure by Letters Patent is:

1. In a tractor, the combination of a main frame made up of side bars, a base casting connected and supported between the said frame bars provided with a vertical cylindrical housing at the front, a crawler tractor truck having a suitable casing having a turntable connection to the said housing and having a vertical driven shaft disposed within the same, an endless crawler chain carried in the lower part of said truck, sprocket and chain means for driving the same, a cross shaft in the upper part of said truck for the driving sprocket wheels, a worm on the said vertical shaft and a worm gear on the cross shaft for driving the same, an internal combustion engine supported on the base casting having gear connections for driving said vertical shaft, a segment gear carried by the casing of said traction crawler truck, a worm gear segment at the front of said truck casing, a worm on a cross shaft carried by the tractor frame, a worm gear on the said cross shaft, and a steering column having a worm for engaging the last aforesaid worm gear.

2. In a tractor, the combination of a main frame made up of side bars, a base casting connected and supported between the said frame bars provided with a vertical cylindrical housing at the front, a crawler tractor truck having a suitable casing having a turntable connection to the said housing and having a vertical driven shaft disposed within the same, an endless crawler chain carried in the lower part of said truck, sprocket chains for driving the same, a cross shaft in the upper part of said truck for the driving sprocket wheels, gear connections between said vertical and cross shafts, an internal combustion engine supported on the base casting having gear connections for driving said vertical shaft, a segment gear carried by the casing of said traction crawler truck, a worm gear segment at the front of said truck casing, a worm on a cross shaft carried by the tractor frame, a worm gear on the said cross shaft, and a steering column having a worm for engaging the last aforesaid worm gear.

3. In a tractor, the combination of a main frame made up of side bars, a base casting connected and supported between the said frame bars provided with a vertical cylindrical housing at the front, a crawler tractor truck having a suitable casing having a turntable connection to the said housing and having a vertical driven shaft disposed within the same, an endless crawler chain carried in the lower part of said truck, means to drive said crawler chain, an internal combustion engine supported on the base casting having gear connections for driving said vertical shaft, a segment gear carried by the casing of said traction crawler truck, a worm gear segment at the front of said truck casing, a worm on a cross shaft carried by the tractor frame, a worm gear on the said cross shaft, and a steering column having a worm for engaging the last aforesaid gear.

4. In a tractor, the combination of a main frame made up of side bars, a base casting connected and supported between the said frame bars provided with a vertical cylindrical housing at the front, a crawler tractor truck having a suitable casing having a turntable connection to the said housing and having a vertical driven shaft disposed within the same, an endless crawler chain carried in the lower part of said truck, sprocket and chain means for driving the same, a cross shaft in the upper part of said truck for the driving sprocket wheels and chains, a worm on the said vertical shaft and a worm gear on the cross shaft for driving the same, an internal combustion engine supported on the base casting having gear connections for driving said vertical shaft, and steering means to control said truck.

5. In a tractor, the combination of a base casting having a vertical cylindrical housing at the front, a crawler tractor truck having a suitable casing with turntable bearing, an endless crawler chain means in said truck, means for driving the same, a turntable structure on the top of the casing of said crawler truck to cooperate with said bearing, a vertical driven shaft carried by said crawler truck and centrally disposed of the said housing and bearing, an engine and gear connections disposed on said base casting for driving the said vertical shaft to drive the crawler.

PAUL M. MARSHALL.